US008760563B2

(12) United States Patent
Koziol et al.

(10) Patent No.: US 8,760,563 B2
(45) Date of Patent: Jun. 24, 2014

(54) AUTOFOCUSING OPTICAL IMAGING DEVICE

(75) Inventors: Thomas Koziol, Camillus, NY (US); Alec Epting, Waxhaw, NC (US); Stephen Patrick Deloge, Palmyra, NY (US); Jeffrey Baker, Gastonia, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 225 days.

(21) Appl. No.: 12/907,140

(22) Filed: Oct. 19, 2010

(65) Prior Publication Data

US 2012/0092531 A1  Apr. 19, 2012

(51) Int. Cl.
*H04N 5/232* (2006.01)

(52) U.S. Cl.
USPC ............................. 348/345; 348/349; 348/335

(58) Field of Classification Search
USPC ........... 348/240.3, 349, 335, 345; 235/462.41
See application file for complete search history.

(56) References Cited

U.S. PATENT DOCUMENTS

| 2,572,915 A | 10/1951 | Devine |
| 3,138,706 A | 6/1964 | Brown et al. |
| 3,678,836 A | 7/1972 | Dietz |
| 3,918,071 A | 11/1975 | Albrecht |
| 4,005,443 A | 1/1977 | Albrecht |
| 4,072,969 A | 2/1978 | Cheavin |
| 4,083,056 A | 4/1978 | Nakamura et al. |
| 4,183,641 A | 1/1980 | Kondo |
| 4,235,547 A | 11/1980 | Iwata |
| 4,283,129 A | 8/1981 | Bennick, Jr. |
| 4,320,947 A | 3/1982 | Komine |
| 4,326,790 A | 4/1982 | Hirata et al. |
| 4,472,040 A | 9/1984 | Kawabata |
| 4,473,284 A | 9/1984 | Hiramatsu et al. |
| 4,561,747 A | 12/1985 | Ohno et al. |
| 4,579,438 A | 4/1986 | Sato et al. |
| 4,692,007 A | 9/1987 | Vogt |
| 4,714,938 A | 12/1987 | Kazami et al. |
| 4,724,319 A | 2/1988 | Shirota |
| 4,816,860 A | 3/1989 | Iida et al. |
| 4,841,323 A | 6/1989 | Yamada et al. |
| 4,841,325 A | 6/1989 | Hoshino et al. |
| 4,860,045 A | 8/1989 | Hamada et al. |
| 4,868,592 A | 9/1989 | Suzuki et al. |

(Continued)

FOREIGN PATENT DOCUMENTS

| WO | WO2004075096 A1 | 9/2004 |
| WO | WO 2010147609 A1 | 12/2010 |

OTHER PUBLICATIONS

Jun. 1, 2012 European Search Report in European Application No. 12151182.8.

(Continued)

*Primary Examiner* — Twyler Haskins
*Assistant Examiner* — Fayez Bhuiyan
(74) *Attorney, Agent, or Firm* — Additon, Higgins, Pendleton & Ashe, P.A.

(57) ABSTRACT

An optical imager includes: an image sensor for capturing images of targets and outputting image signals; a lens for focusing the target on the image sensor as a function of lens position; a memory for storing predetermined lens positions determined from predetermined target sizes; and a controller for determining current target size based on captured images and positioning the lens at a predetermined lens position by correlating current target size with predetermined target sizes.

14 Claims, 7 Drawing Sheets

(56) References Cited

U.S. PATENT DOCUMENTS

| | | | |
|---|---|---|---|
| 4,873,543 A | 10/1989 | Matsuzaki et al. |
| 4,876,564 A | 10/1989 | Amikura et al. |
| 4,908,645 A | 3/1990 | Higashihara et al. |
| 4,928,010 A | 5/1990 | Saito et al. |
| 4,933,692 A | 6/1990 | Kudo et al. |
| 4,935,763 A | 6/1990 | Itoh et al. |
| 4,949,107 A | 8/1990 | Kitagishi et al. |
| 4,959,675 A | 9/1990 | Seki et al. |
| 5,047,646 A | 9/1991 | Hattori et al. |
| 5,051,766 A | 9/1991 | Nonaka et al. |
| 5,072,250 A | 12/1991 | Makino |
| 5,130,734 A | 7/1992 | Taniguchi et al. |
| 5,148,210 A | 9/1992 | Minaki et al. |
| 5,157,435 A | 10/1992 | Min et al. |
| 5,249,011 A | 9/1993 | Sakai |
| 5,249,012 A | 9/1993 | Taniguchi et al. |
| 5,349,415 A | 9/1994 | Nishida |
| 5,497,209 A | 3/1996 | Iwane |
| 5,552,853 A | 9/1996 | Muramatsu et al. |
| 5,587,762 A | 12/1996 | Watanabe |
| 5,589,911 A | 12/1996 | Nonaka |
| 5,594,518 A | 1/1997 | Ohshita |
| 5,606,382 A | 2/1997 | Suh |
| 5,687,403 A | 11/1997 | Ohtake |
| 5,715,483 A | 2/1998 | Omata et al. |
| 5,721,970 A | 2/1998 | Ikeda |
| 5,742,850 A | 4/1998 | Nomura et al. |
| 5,758,206 A | 5/1998 | Imaoka |
| 5,828,499 A | 10/1998 | Ohtake |
| 5,875,359 A | 2/1999 | Ohtake et al. |
| 5,889,577 A | 3/1999 | Kohayakawa |
| 5,897,227 A | 4/1999 | Haraguchi et al. |
| 5,900,927 A | 5/1999 | Hasegawa |
| 5,907,724 A | 5/1999 | Uno et al. |
| 5,943,514 A | 8/1999 | Sato et al. |
| 5,965,894 A | 10/1999 | Krijn et al. |
| 5,966,551 A | 10/1999 | Haraguchi et al. |
| 5,973,846 A | 10/1999 | McConica |
| 5,973,855 A | 10/1999 | Shibayama |
| 5,980,125 A | 11/1999 | Julich |
| 5,995,766 A | 11/1999 | Yamashita |
| 6,038,404 A | 3/2000 | Suzuki et al. |
| 6,072,637 A | 6/2000 | Okada et al. |
| 6,091,452 A | 7/2000 | Nishiyama |
| 6,091,901 A | 7/2000 | Ogawa |
| 6,104,879 A | 8/2000 | Suzuki |
| 6,115,188 A | 9/2000 | Nishio et al. |
| 6,208,809 B1 | 3/2001 | Kanai et al. |
| 6,240,252 B1 | 5/2001 | Yamaguchi et al. |
| 6,246,833 B1 | 6/2001 | Harada |
| 6,266,486 B1 | 7/2001 | Kohno |
| 6,329,659 B1 | 12/2001 | Krijn et al. |
| 6,373,524 B2 | 4/2002 | Suda et al. |
| 6,374,060 B1 | 4/2002 | Mogamiya |
| 6,380,546 B1 | 4/2002 | Petrov et al. |
| 6,453,123 B1 | 9/2002 | Oshima |
| 6,549,729 B1 | 4/2003 | Robins et al. |
| 6,556,785 B2 | 4/2003 | Nonaka et al. |
| 6,614,998 B1 | 9/2003 | Senba et al. |
| 6,701,075 B2 | 3/2004 | Ogino |
| 6,718,132 B2 | 4/2004 | Nishina |
| 6,721,499 B2 | 4/2004 | Watanabe et al. |
| 6,895,181 B2 | 5/2005 | Nonaka et al. |
| 7,025,272 B2 | 4/2006 | Yavid et al. |
| 7,079,180 B1 | 7/2006 | Fukuda |
| 7,189,981 B2 | 3/2007 | Moon et al. |
| 7,262,418 B2 | 8/2007 | Lo et al. |
| 7,362,967 B2 | 4/2008 | Lan et al. |
| 7,410,100 B2 | 8/2008 | Muramatsu |
| 7,474,846 B2 | 1/2009 | Subbotin |
| 7,493,035 B2 | 2/2009 | Kuo et al. |
| 7,512,328 B2 | 3/2009 | Suda |
| 7,526,190 B2 | 4/2009 | Kato |
| 7,545,432 B2 | 6/2009 | Lee |
| 7,598,997 B2 | 10/2009 | Shiraishi |
| 7,600,192 B1 | 10/2009 | Hashimoto et al. |
| 7,609,319 B2 | 10/2009 | Kobayashi |
| 7,614,559 B2 | 11/2009 | Sugimoto |
| 7,615,729 B2 | 11/2009 | Klein |
| 7,627,239 B2 | 12/2009 | Terayama |
| 7,634,186 B2 | 12/2009 | Nojima |
| 7,639,937 B2 | 12/2009 | Subbotin |
| 7,657,171 B2 | 2/2010 | Sundstrom |
| 7,726,573 B2 | 6/2010 | Gurevich et al. |
| 7,729,604 B2 | 6/2010 | Wen |
| 7,747,159 B2 | 6/2010 | Uenishi |
| 7,793,840 B2 * | 9/2010 | Vinogradov ............... 235/454 |
| 7,796,875 B2 | 9/2010 | Lin et al. |
| 2002/0021895 A1 | 2/2002 | Kanai et al. |
| 2002/0021897 A1 | 2/2002 | Nakata |
| 2002/0118966 A1 | 8/2002 | Hofer et al. |
| 2002/0154909 A1 | 10/2002 | Yamazaki et al. |
| 2003/0002867 A1 | 1/2003 | Ojala |
| 2003/0138742 A1 | 7/2003 | Irie et al. |
| 2003/0202788 A1 | 10/2003 | Watanabe et al. |
| 2004/0159703 A1 * | 8/2004 | Kogan et al. ............... 235/454 |
| 2005/0045831 A1 | 3/2005 | Hendrik Maes et al. |
| 2005/0092841 A1 * | 5/2005 | Barkan ............... 235/462.25 |
| 2005/0111842 A1 | 5/2005 | Nakagawa |
| 2005/0230633 A1 | 10/2005 | Lo et al. |
| 2005/0271373 A1 | 12/2005 | Tomita |
| 2006/0038017 A1 * | 2/2006 | Carlson et al. ........... 235/462.24 |
| 2006/0060789 A1 | 3/2006 | Rogers |
| 2006/0097184 A1 | 5/2006 | Frosien |
| 2006/0127078 A1 | 6/2006 | Onozawa |
| 2006/0228098 A1 | 10/2006 | Yoshida |
| 2007/0047942 A1 | 3/2007 | Chang et al. |
| 2007/0077048 A1 | 4/2007 | Liao et al. |
| 2007/0140677 A1 | 6/2007 | Hsieh et al. |
| 2007/0201852 A1 | 8/2007 | Cheng |
| 2007/0269197 A1 | 11/2007 | Ide et al. |
| 2007/0280664 A1 | 12/2007 | Ikeda et al. |
| 2008/0037974 A1 | 2/2008 | Chi |
| 2008/0080848 A1 | 4/2008 | Tsai |
| 2008/0124068 A1 | 5/2008 | Kwon et al. |
| 2008/0166117 A1 | 7/2008 | Li et al. |
| 2008/0217553 A1 | 9/2008 | Ohtoshi et al. |
| 2008/0240700 A1 | 10/2008 | Takagi |
| 2009/0016708 A1 | 1/2009 | Takeuchi |
| 2009/0016709 A1 | 1/2009 | Wen |
| 2009/0045259 A1 | 2/2009 | Ehrhart et al. |
| 2009/0074393 A1 | 3/2009 | Park et al. |
| 2009/0116829 A1 | 5/2009 | Subbotin |
| 2009/0142046 A1 | 6/2009 | Lin et al. |
| 2009/0169193 A1 | 7/2009 | Wen |
| 2009/0236424 A1 | 9/2009 | Hennick et al. |
| 2009/0256081 A1 | 10/2009 | Kaga |
| 2009/0310954 A1 | 12/2009 | Chang et al. |
| 2010/0020222 A1 | 1/2010 | Jones et al. |
| 2010/0044440 A1 * | 2/2010 | Wang et al. ............... 235/462.24 |
| 2010/0079602 A1 * | 4/2010 | Napper et al. ............ 348/208.1 |
| 2010/0098395 A1 | 4/2010 | Hiraoka |
| 2010/0104271 A1 | 4/2010 | Park et al. |
| 2010/0124413 A1 | 5/2010 | Moon |
| 2010/0157086 A1 | 6/2010 | Segale et al. |
| 2010/0189427 A1 | 7/2010 | Ilya et al. |
| 2010/0247084 A1 | 9/2010 | Kato |
| 2010/0278520 A1 | 11/2010 | Karasawa |
| 2012/0182461 A1 | 7/2012 | Pease et al. |

OTHER PUBLICATIONS

Jun. 21, 2012 Communication pursuant to Article 94(3) EPC in European Application No. 12151182.8.
Apr. 12, 2013 Office Action in European Application No. 11184751.3, 4 pages.

* cited by examiner

AUTOFOCUSING OPTICAL IMAGING DEVICE

FIELD OF THE INVENTION

The present invention relates to optical imaging devices, and more particularly to an optical imaging device with an improved lens focusing system.

BACKGROUND

Optical imaging devices receive light from a target with an image sensor that outputs image data which is interpreted by a processor which performs signal and/or image processing.

Often times an optical imager may be portable and wireless in nature thereby providing added flexibility. In these circumstances, such imagers form part of a wireless network in which data collected within the terminals is communicated to a host computer situated on a hardwired backbone via a wireless link. For example, the imagers may include a radio or transceiver for communicating with a remote computer.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to imaging or extracting data from an information bearing optical (or symbol). The term imaging used herein refers to the taking, capturing or creation of an electronic image.

Figure 1:
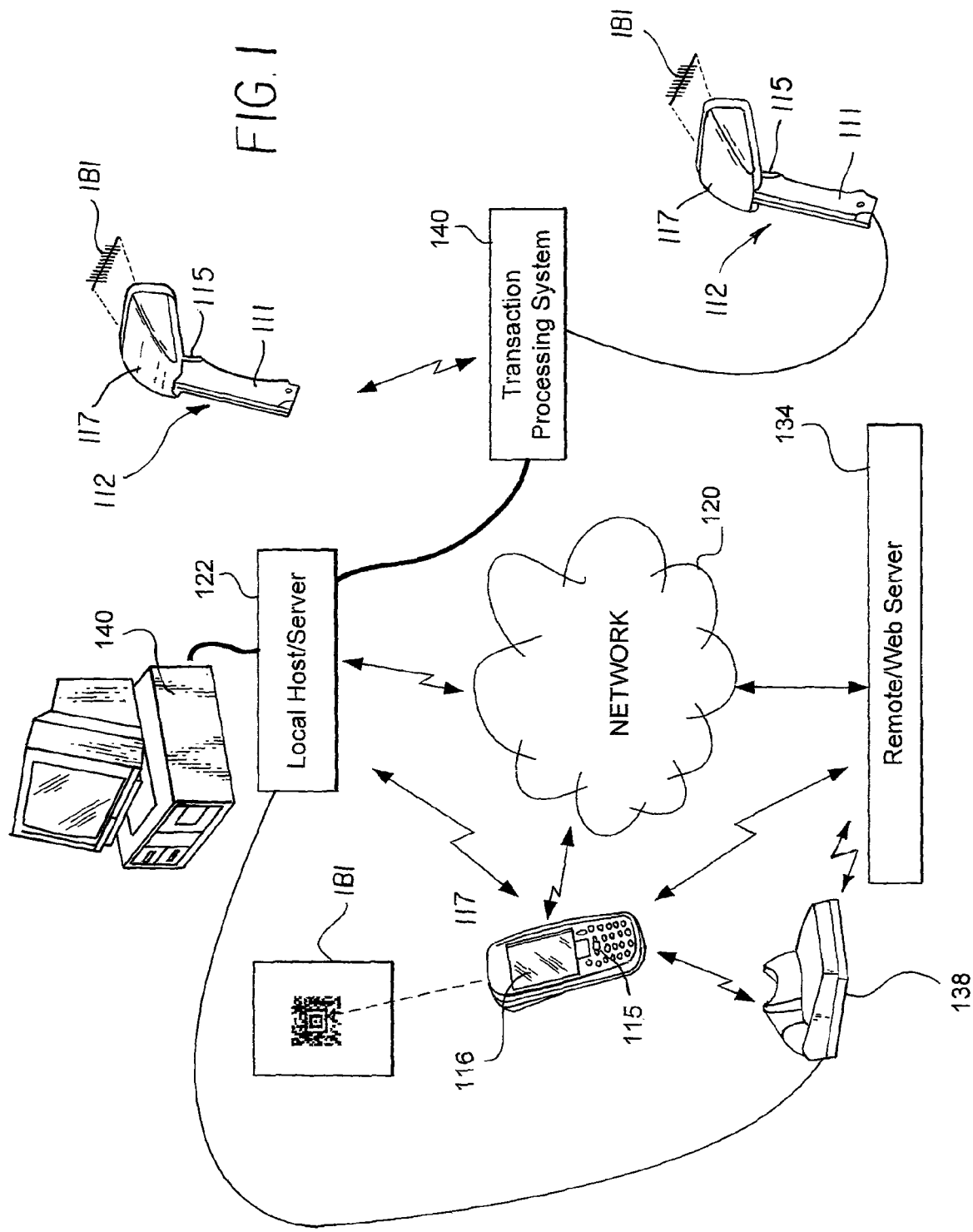
FIG. 1 is a block diagram of an exemplary optical imaging system.

FIG. 1 illustrates an exemplary imaging system configuration, wherein a plurality of optical imagers 112 may be operated and utilized where information bearing optical (IBI) are present. The optical imagers may be stationary or hand-held devices, utilizing image capturing devices for extracting data from targets.

An operator may aim a hand-held optical imager 112 at a target and actuate a button or trigger 115 on the optical imager to control full or partial operation of the imager. The imager may be utilized in a presentation mode, wherein the imager takes consecutive images without the need for trigger activation.

An exemplary optical imager 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an optical imager used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, etc. An exemplary optical imager may have a display 116. An exemplary optical imager 112 may have a number of subsystems provided within a housing 117 configured to be hand held. For example, the imager may have a handle portion 111.

Exemplary optical imagers may be in communication (wired or wireless) to a local transaction processing system 140, such as a cash register, customer station or employee station or local host/server 125 directly or through a charging station or base 138. An exemplary local server 125 or optical imager 112 may be in communication with network 120 and or a remote/web server 134.

Figure 2:
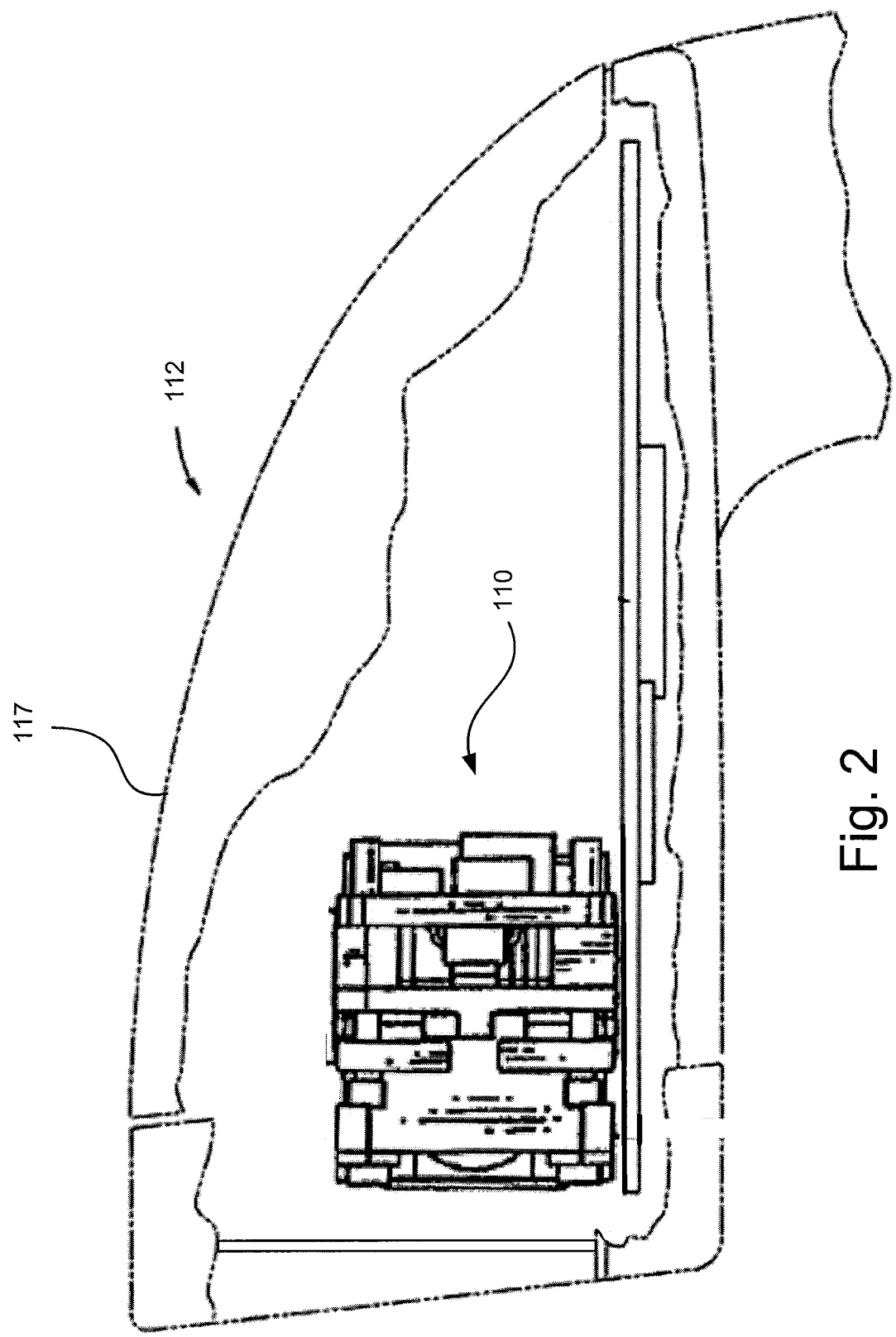
FIG. 2 is a fragmentary partially cutaway side view of an exemplary optical imager having an imaging module.

FIG. 2 illustrates an enlarged fragmentary cross-sectional view of an exemplary optical or optical imager 112 which may include an imaging assembly 110 packaged in a housing 117.

Figure 3:
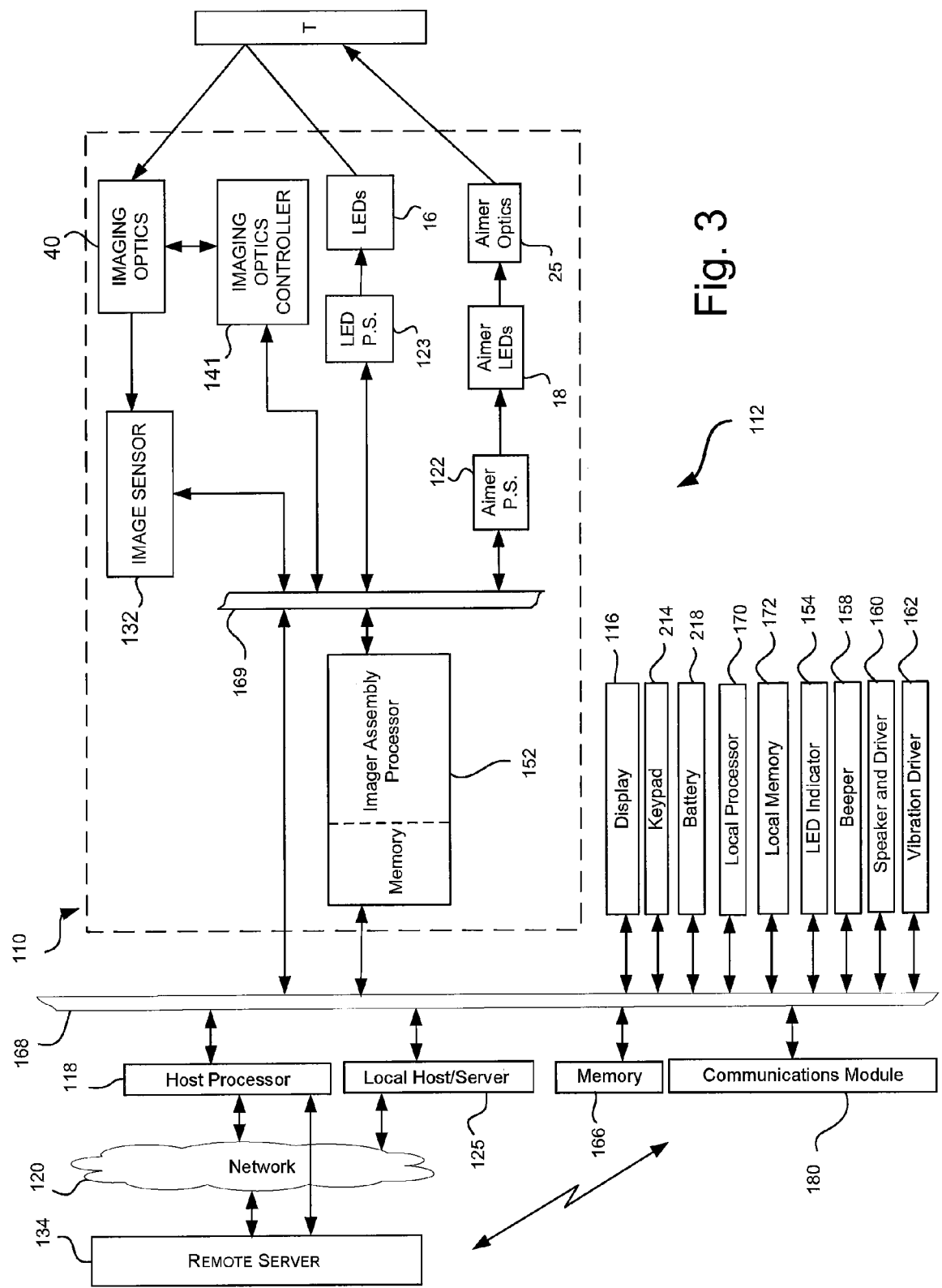
FIG. 3 is a block schematic diagram of an exemplary optical imager.

Referring to FIG. 3, an exemplary imaging system may include an imaging assembly 110 which may include an image sensor device 132. An exemplary image sensor device 132 converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAKING OPTICAL IMAGER HAVING HYBRID MONOCHROME AND COLOR IMAGE SENSOR ARRAY the entirety of which is hereby incorporated herein by reference.

An exemplary image sensor device may include an image sensor processor, an analog to digital converter (ADC) and other circuitry.

Imaging assembly 110 may include a programmable control circuit or imaging device processor 152, which may control the amount of illumination provided by LEDs 16 by controlling the output power provided by LED power supplies 123. Processor 152 may also control other functions and devices, such as aimer power supplies for powering aimer LEDs 18. Processor 152 may include a predetermined amount of memory for storing data and configurable blocks of analog and digital logic, as well as programmable interconnects.

Illuminating optics (not shown), aimer optics components 25, (such as lenses, diffusers, wedges, reflectors, etc.) may be utilized for directing light in the direction of a target object T. Laser or light emitting diodes (LEDs) such as white LEDs or red, infrared LEDs may be utilized. Illumination may be eliminated or disabled if ambient light levels are high enough to allow high quality images of object T to be taken. Illumination may also be located remote from the imaging device so as to eliminate or reduce specular reflections.

In an exemplary embodiment, an imaging assembly includes imaging optics 40 for focusing light from a target onto image sensor device 132. Image imager assembly 114 has imaging optics or lens 40 having an optical axis (OA) for receiving light reflected from a target T and directing or projecting the reflected light from the target T to image sensor 132. The optical axis is a line of symmetry through the imaging optics.

The imaging optics 40 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

Figure 4:
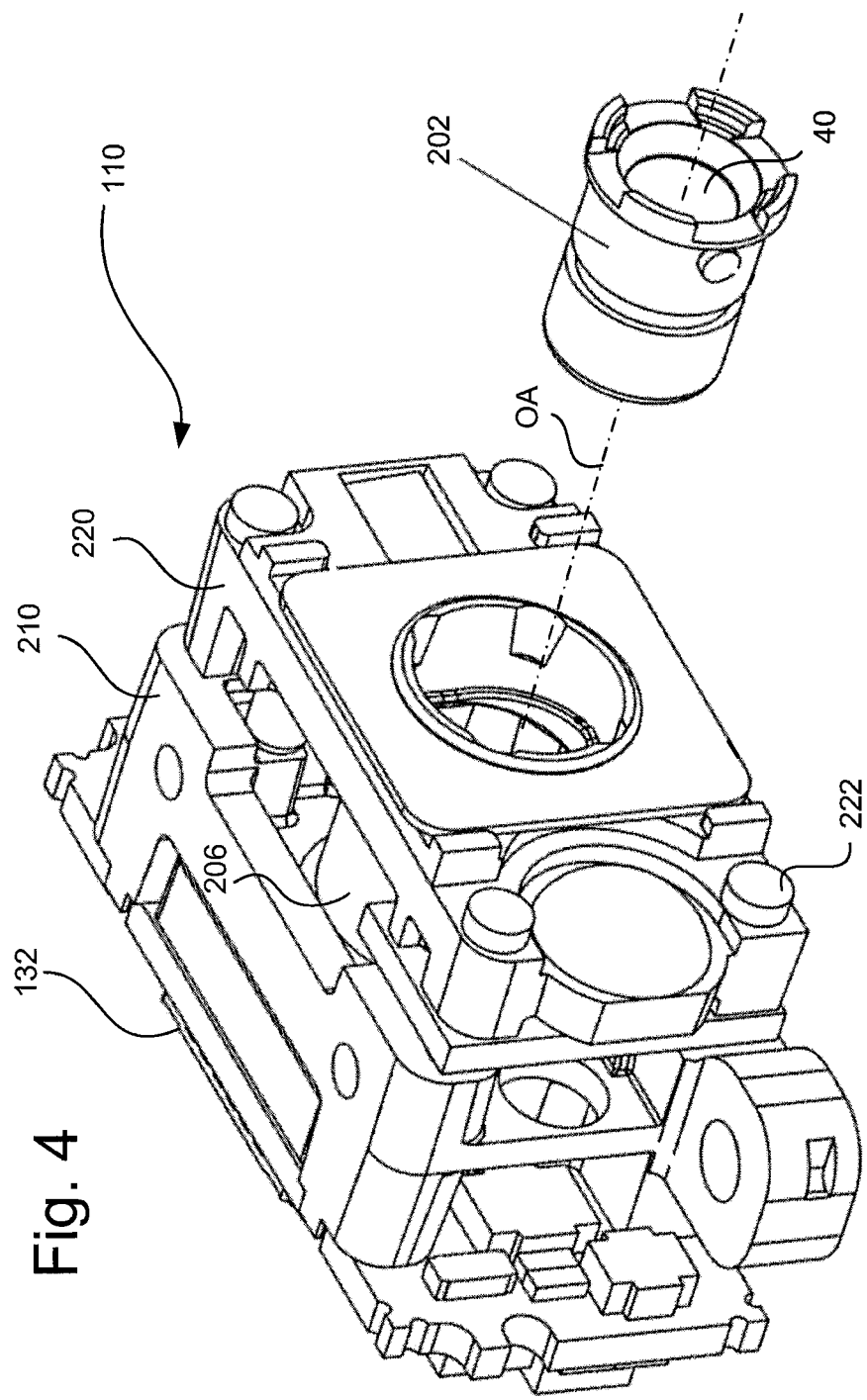
FIG. 4 is a perspective assembly view of an exemplary imaging module assembly.
Figure 5:
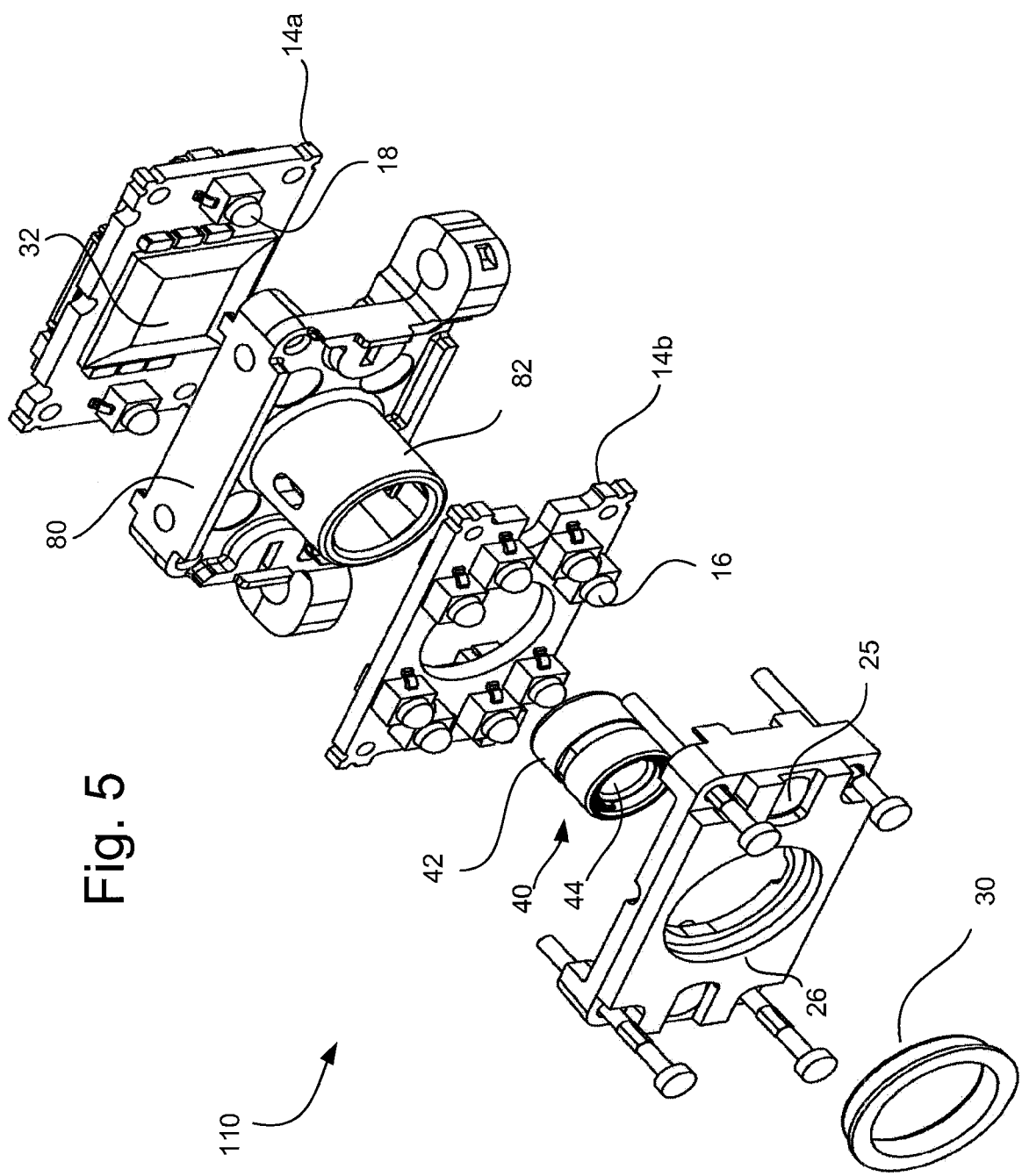
FIG. 5 is a perspective assembly view of an exemplary imaging module assembly.

An exemplary imaging assembly 110 illustrated in FIG. 4 may include imaging receive optics 40 disposed or contained within a generally cylindrical barrel 202. Barrel 202 is slidably disposed or contained within a generally cylindrical sleeve 206. Sleeve 206 is secured to an imager assembly body 210 which may provide a platform for, amongst other items, the image sensor 132. When barrel 202 is moved axially within sleeve 204, the imaging optics 40 may be brought in and out of focus with the image sensor 132. Imaging optics 40 may therefore be positioned to a precise desired location within sleeve 206 in order to bring the target in focus with the image sensor. The barrel 202 is inserted into sleeve 206 and rotated to change the position of optics 40 along the optical axis OA to precisely locate optics 152 at a desired location relative to image sensor 132. The barrel may be moved within the sleeve utilizing an image optics controller (not shown in FIG. 4).

Referring to FIG. 3, imaging optics 40 may be focused utilizing an imaging optics controller 141, which is controlled by a processor, such as processor 152 or an independent processor, which may employ autofocus software logic. Autofocus logic may move the lens mechanism through a range of motion, distance or positions, sampling images at different positions while attempting to determine an optimal focal point or position. The imaging optics controller may have a drive mechanism or device that is capable of moving the lens to different positions within a maximum range of position or motion.

In an exemplary embodiment, the range of motion the autofocus logic will use to determine an optimal focal point is limited or less than the maximum range of motion based on the size of the item or target being imaged and/or the approximated distance from the imager. Reducing the distance the lens moves during an autofocus cycle to a range that is likely to provide an in focus image based on various input an in focus high quality image may be captured in a shorter time period.

In an exemplary embodiment, the optimal focal point or setting for imaging various targets or items is determined empirically through experimentation. These focal points are stored in memory and used as a center point for minimum and maximum values used to constrain the autofocus logic. The autofocus logic uses these minimum and maximum values to limit lens travel during the autofocus cycle less than the maximum amount of travel the lens is capable of moving. The minimum and maximum values may be provided to the autofocus logic through a variety of methods.

Figure 6:
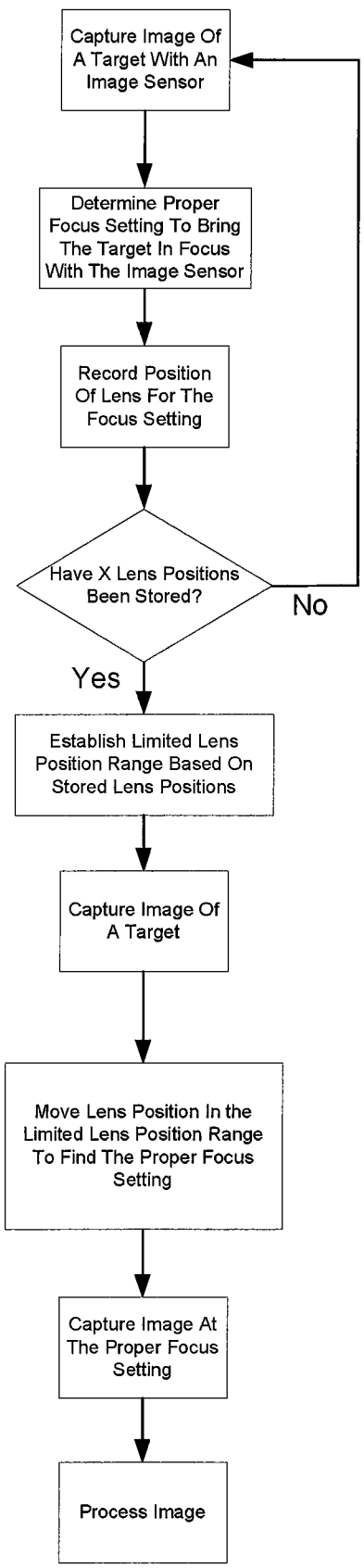
FIG. 6 is a flowchart of an exemplary method of operating an optical imager.

An exemplary embodiment for operating an image imager illustrated in FIG. 6 comprises: capturing an image of a target in a setup mode; determining the proper focus setting or point to bring the target in focus with the image sensor; record the position of lens for the focus setting; determine if a certain number of predetermined lens positions been stored; establish a limited lens position range based on the stored lens positions; capturing an image of a target in an autofocusing mode; moving the lens position within the lens position range to find the proper focus setting; capturing an image of the target at the proper focus setting; and processing the image.

In an exemplary embodiment, the range of distances the autofocus logic will use to position the lens is based on the center point of the recorded lens positions.

In an exemplary embodiment, the range of distances the autofocus logic will use to position the lens is based on the size of the item being imaged.

In an exemplary embodiment, the range of distances the autofocus logic uses to position the lens is based on the approximate distance of the item from the imager.

In an exemplary embodiment, the optimal focal point for imaging various items is determined through experimentation.

In an exemplary embodiment, the optimal focal points for imaging various items are used as a center point for minimum and maximum values that may be used by the autofocus logic to constrain or limit the lens autofocusing range of motion or travel.

Reducing the distance the lens moves during an autofocus cycle to a range that is most likely to provide an in focus image may be captured in a shorter time period.

Figure 7:
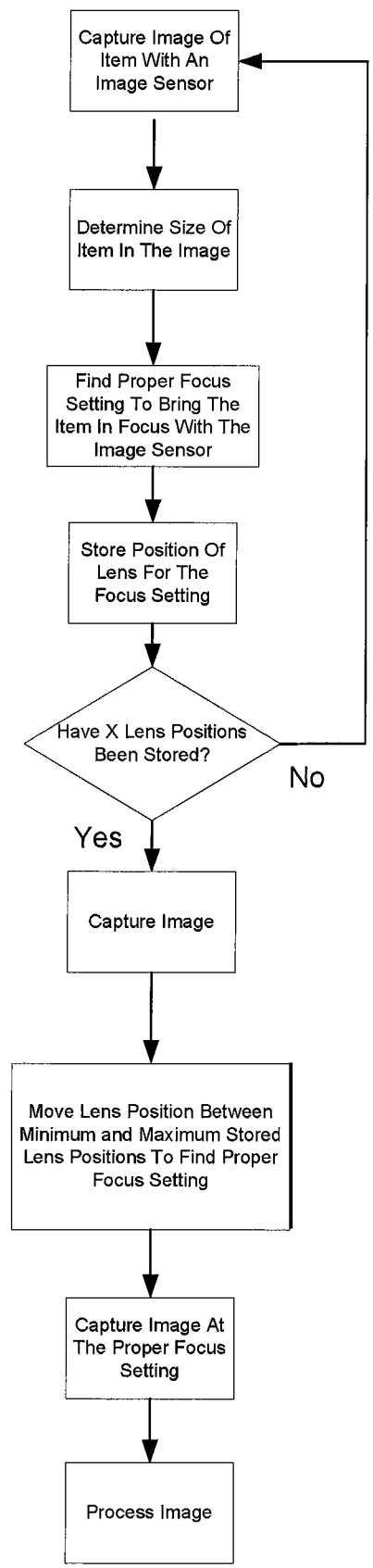
FIG. 7 is a flowchart of an exemplary method of operating an optical imager.

An exemplary embodiment for operating an image imager illustrated in FIG. 7 comprises: capturing an image of a target in a setup mode; determining the size of a target in the image; finding the proper focus setting for the target; recording the position of the optical lens for that focus setting; determining whether desired number of lens positions been recorded and if so; capturing another image in an operating mode; moving the lens position between the minimum and maximum previously recorded lens positions to find proper focus setting for the image taken and capturing another image at the proper focus setting and processing the image, wherein the minimum and maximum recorded lens positions represents a distance or motion which is less than the maximum lens motion the lens is capable of moving.

An optical imager autofocusing system is described in United States Patent Application Publication Number 20100044440 entitled SYSTEM AND METHOD TO AUTOMATICALLY FOCUS AN IMAGE IMAGER, which is hereby incorporated herein in it's entirety.

An exemplary method of operating an optical imager comprises: a) focusing light from a target on an image sensor utilizing a lens; b) capturing a test image of the target in a setup mode with the image sensor; c) determining the size of a target from the image; d) moving the lens to determine the proper focus setting of the lens with the image sensor as a function of the target size; e) storing the position of the lens for the determined proper focus setting; f) determining whether a desired number of lens positions have been stored for a plurality of target sizes; g) repeating steps a through g if step f is determined negative; h) capturing an operating image in an operating mode if step f is determined positive; i) moving the lens between the minimum and maximum previously recorded lens positions to obtain the proper focus setting for the operating image; j) capturing another image at the proper focus setting; and, k) processing the operating image, wherein the minimum and maximum recorded lens positions represents a motion range which is less than the maximum possible optical imager lens motion range.

An exemplary optical imager includes: an image sensor for capturing images of targets and outputting image signals; a lens for focusing the target on the image sensor as a function of lens position; a memory for storing predetermined lens positions determined from predetermined target sizes; and a controller for determining current target size based on captured images and positioning the lens at a predetermined lens position by correlating current target size with predetermined target sizes.

An exemplary controller further determines current target distance and positions the lens at the predetermined lens position by correlating current target distance with predetermined target distances.

In an exemplary embodiment, the predetermined lens positions define a predetermined lens motion range and the controller positions the lens within the predetermined lens motion range, the predetermined lens motion range being smaller than the actual lens motion range.

In an exemplary embodiment, the controller begins lens positioning at a center of the predetermined lens motion range.

Other exemplary imager subsystems or components supported by the housing may include one or more local or on board processor(s) 170, local memory 172, a battery 218, a display 116, a key pad 214 and a wireless communications module 180. The subsystems may communicate via one or more bus 168, 169, data lines or other signal or data communication form. The optical imager may communicate with one or more local processor(s) 118, a local host/server 125, local memory 166, network 120 or remote server host/server 134.

Communications module 180 may provide a communication link from imaging imager 112 to other optical imagers or to other systems such as a server/remote processor 134.

An exemplary processor may be a mixed-signal array with on-chip controller devices designed to replace multiple traditional MCU-based system components with one single-chip programmable device. It may include configurable blocks of analog and digital logic, as well as programmable interconnects.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon configuration settings stored in firmware or memory which may be any one of a number of memory types such as RAM, ROM, EEPROM, etc. In addition some memory functions may be stored in memory provided as part of the processor(s). Configuration settings may be arranged as parameter tables.

Exemplary functions of the processor(s) may be controlling operation the scan engine including lens focusing, decoding functions and operator interface functions. Operating software may be utilized to operate the processor(s) for such functions seemingly simultaneously or in a multitasking role. An exemplary image imager operating software architecture may be organized into processes or threads of execution.

Processor(s), memory and associated circuitry which perform or control the exemplary scan and decoding functions may be provided in the scan engine or on associated circuit boards which are located within the housing of the imager. Decoding is a term used to describe the interpretation of a machine readable code contained in the photodetector output signal. The processor(s) may be located on board or within the housing with other subsystems.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the imager will use.

Two exemplary scanning modes may be continuous or discontinuous. In the continuous mode (also referred to as continuous scanning mode, continuous streaming mode, streaming mode, fly-by scanning mode, on the fly scanning mode or presentation mode) the imager is held in a stationary manner and targets (such as symbols located on packages) are passed by the imager. In the continuous mode, the imager takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the imager in discontinuous mode is via hand held operation. Decoding stops once the optical imager is no longer triggered. The discontinuous mode is typically initiated because the operator knows a symbol is present.

Exemplary optical imagers may use memory or firmware to store imager settings or imager configuration settings.

Exemplary configuration settings are:

the current port utilized to send output data over
address buffer space in which scan data will be stored
whether scanning is to be continuous or discontinuous
codes which are enabled for processing
aiming pattern center coordinates
aimer configuration
aiming system power output
optical imager configuration optical imager orientation
number of pixels in the image to be used for initializing buffers
engine orientation
field illumination
information regarding lens distortions
information regarding image distortion
dead or bad imager pixels
image sensor noise corrections within the image processing algorithm
Illumination LED current
receiving lens prescription or parameters
whether the imager is enabled for image capture
what type of decoder level is enabled
what types of symbology decoding is enabled
scanning distance
trigger functionality
pre-defined bar code output data based on the scan input
continuous scanning mode
discontinuous scanning mode or routine
decoding mode or routine
I/O configurations
min/max symbology character lengths
scan engine selection
illumination control
settings that affect the functional operation of the processor(s)
aimer operation
engine orientation
illumination
photosensor control
speaker control
beeper control
notification LED control
software control
sales tracking
warranty tracking
scanner capabilities
exposure gain Imagers may be programmed by means of bar codes menus, via serial connection using serial commands or via wireless communication. A GUI interface may be utilized for creating or imaging serial commands, such as Visual Menu or similar such product. This may be done locally or remotely by connecting the imager either directly or through a network (such as the internet) to a remote computer and having the remote computer provide software upgrades.

An exemplary lens position controller may utilize a software program or software logic. Exemplary programming methods may be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. These signals are referred to as "bits", "values", "elements", "symbols", "characters", "images", "terms", "numbers", or the like.

There exist a variety of platforms and languages for creating software. Exemplary embodiments may be implemented using VBSCRIPT® (a trademark of Microsoft Corporation), JAVA™ (a trademark of Sun Microsystems, Inc.), PYTHON™ (a trademark of Python Software Foundation) or any number of varieties of C. The choice of platform and language is often dictated by the specifics of the actual system constructed, such that what may work for one type of system may not be efficient on another system.

Referring to FIG. 4, an exemplary imaging module 110 may include a light source 16 for illuminating a target. The light source is located a distance away from a lens 40, which focuses light being received from the target on an image sensor 32.

Imaging module 110 may include a first board 14a carrying such things as an image sensor 32 typically provided by an image sensor chip and aiming light sources 18, an imager processor, memory, etc. and a second circuit board 14b for carrying such things as illumination light sources 16. The first and second circuit boards 14a and 14b are supported by a support assembly 80. Support assembly 80 may include a containment section for containing image sensor 32 and an integrated retainer section 82 for retaining a lens or optics assembly 40 having a lens 44 retained by a lens housing 42. Imaging module 110 further may include an optical plate 26 which serves as a light pipe to carry various emitted light for aiding in the development of a substantially uniform illumination pattern over a target area corresponding to a field of view of image sensor 32. Aiming optic 25 aids in the projection of an aiming pattern on a target area.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of operating an optical imager comprising:
   (a) capturing an image of a target in a set up mode with an image sensor;
   (b) determining the proper focus setting of a lens to bring a target in focus with the image sensor;
   (c) storing a position of the lens for the determined proper focus setting;
   (d) repeating steps (a) through (c) until a desired number of lens positions have been stored, wherein lens positions that have been stored include minimum and maximum recorded lens positions;

(e) capturing an operating image in an autofocus mode;
(f) moving the lens between the minimum and maximum previously recorded lens positions to obtain the proper focus setting for the operating image;
(g) capturing a focused image at the proper focus setting; and,
(h) processing the focused image,
wherein the minimum and maximum recorded lens positions represents a motion range which is less than the maximum possible optical imager lens motion range.

2. A method of operating an optical imager in accordance with claim 1, wherein the lens is slidably disposed within a generally cylindrical sleeve.

3. A method of operating an optical imager in accordance with claim 2, wherein the barrel is moved within the sleeve utilizing a lens controller.

4. A method of operating an optical imager in accordance with claim 1, wherein the lens is disposed within a generally cylindrical barrel that is slidably disposed within a generally cylindrical sleeve and the barrel is moved axially within the sleeve to bring the target in proper focus with the image sensor.

5. A method of operating an optical imager in accordance with claim 1, wherein the lens is disposed within a generally cylindrical barrel that is slidably disposed within a generally cylindrical sleeve and the barrel is moved axially within the sleeve to bring the target in proper in focus with the image sensor.

6. A method of operating an optical imager in accordance with claim 1, wherein the lens is moved during the operating mode utilizing an imaging optics controller executing autofocus software logic.

7. A method of operating an optical imager in accordance with claim 1, further comprising approximating distance of the target from the optical imager.

8. A method of operating an optical imager in accordance with claim 1, wherein the stored lens positions are used to determine a center point for the lens motion range.

9. A method of operating an optical imager in accordance with claim 1, wherein image processing comprises decoding information bearing optical present in the operating image.

10. An optical imager comprising:
an image sensor for capturing images of targets and outputting image signals;
a lens for focusing a target on the image sensor at focus points as a function of lens position;
a memory for storing predetermined lens positions determined from the focus points, wherein the lens positions include a minimum recorded lens position and a maximum recorded lens position that define a predetermined lens motion range, the predetermined lens motion range being smaller than the actual lens motion range; and,
a controller that begins lens positioning at a center of the predetermined lens motion range.

11. An optical imager in accordance with claim 10, wherein the lens is slidably disposed within a generally cylindrical sleeve.

12. An optical imager in accordance with claim 10, wherein the controller further determines current target distance and positions the lens at the focus points by correlating current target distance with predetermined target distances.

13. An optical imager in accordance with claim 10, further comprising a decoder for decoding information bearing optical present in the captured image.

14. The optical imager in accordance with claim 10, wherein the focus points are determined empirically though experimentation.

* * * * *